United States Patent [19]

Matsuhira

[11] Patent Number: 5,222,208
[45] Date of Patent: Jun. 22, 1993

[54] DEVICE AND METHOD FOR GENERATING DOT PATTERN ENLARGEMENT DATA

[75] Inventor: Masatoshi Matsuhira, Suwa, Japan

[73] Assignee: Seiko Epson Corporation, Tokyo, Japan

[21] Appl. No.: 487,319

[22] Filed: Mar. 2, 1993

[30] Foreign Application Priority Data

Mar. 3, 1989 [JP] Japan .................................. 1-51413
Mar. 7, 1989 [JP] Japan .................................. 1-54230
Mar. 10, 1989 [JP] Japan .................................. 1-58910

[51] Int. Cl.$^5$ .............................................. G09G 3/00
[52] U.S. Cl. ...................................... 395/150; 395/110
[58] Field of Search ............... 395/102, 110, 114, 107, 395/150, 151; 340/735, 747, 748, 731, 728, 730, 731, 750

[56] References Cited

U.S. PATENT DOCUMENTS

| | | | |
|---|---|---|---|
| 4,107,786 | 8/1978 | Masaki et al. | 340/749 X |
| 4,242,678 | 12/1980 | Somerville | 340/731 X |
| 4,314,244 | 2/1982 | Demke et al. | 340/748 X |
| 4,409,591 | 10/1985 | Simkovitz | 340/750 X |
| 4,630,947 | 12/1986 | Yoshida et al. | 340/731 X |
| 4,680,720 | 7/1987 | Yoshii et al. | 340/728 X |
| 4,712,102 | 12/1987 | Troupes et al. | 340/721 X |

FOREIGN PATENT DOCUMENTS

| | | |
|---|---|---|
| 0100872 | 2/1984 | European Pat. Off. |
| 0177704 | 4/1986 | European Pat. Off. |
| 0215664 | 3/1987 | European Pat. Off. |
| 2110058 | 6/1983 | United Kingdom |

*Primary Examiner*—Heather R. Herndon
*Attorney, Agent, or Firm*—Blum Kaplan

[57] ABSTRACT

A dot pattern data generating device including a character generator constructed to be readable by character code data for storing data representing a character pattern in the form of a matrix according to existence or non-existence of dots in the matrix. The device includes a region readout circuit for reading a local pattern of the matrix with one dot location from the matrix read from the character generator being centered in the matrix portion. An arithmetic circuit is also included for computing horizontal and vertical values from the local pattern. A pattern generating circuit generates a plurality of dots with respect to one dot of the original pattern on the basis of the horizontal and vertical values to generate an enlarged pattern. The enlarged character pattern is generated at a high speed without enlarging stepped portions of the oblique lines simulating smooth portions by generating enlargement dots corresponding thereto.

22 Claims, 12 Drawing Sheets

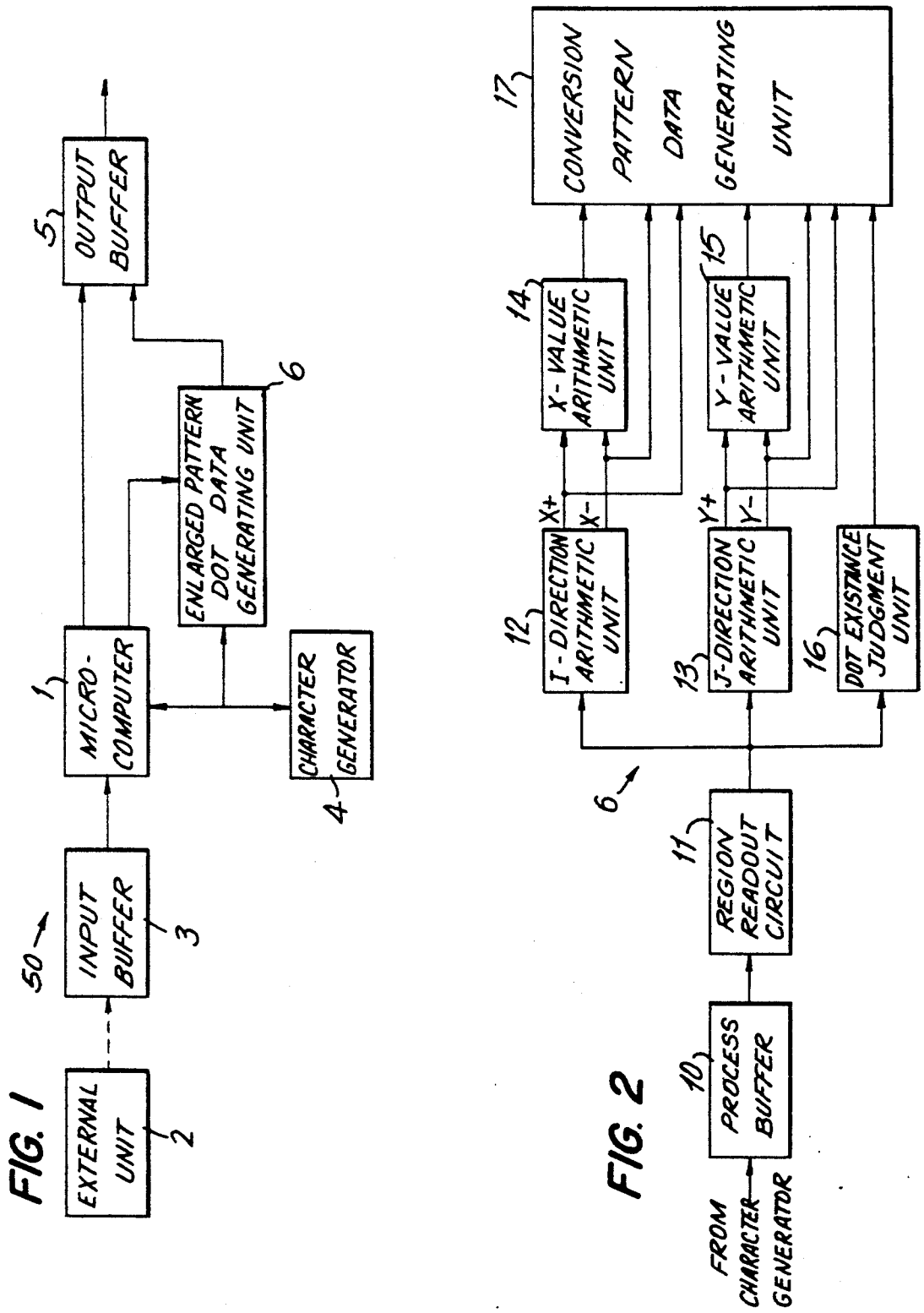

[I]

[II]

[III]

[IV]

[V]

[VI]

DEVICE AND METHOD FOR GENERATING DOT PATTERN ENLARGEMENT DATA

BACKGROUND OF THE INVENTION

The invention relates generally to a device for generating data for dot patterns for forming characters and images and more particularly to a device for forming dot patterns for characters and images of both standard sizes and enlarged sizes without magnifying stepped portions of the characters and images that are intended to simulate smooth lines.

A conventional serial printer includes a plurality of ink nozzles, exothermic elements or impact wires n a printing head mounted on a reciprocating a carriage. A conventional laser printer transfers toner images to a recording medium by exposing a photosensitive drum with laser beams. Both conventional serial and laser printers form characters and graphics by aggregating hyperfine dots so that the observer perceives individual dots as continuous smooth lines. Accordingly, these devices require a dot pattern data generator for converting character code signals into dot patterns.

A typical dot pattern data generating device includes a storage device for storing the characters specified by character code signals in the form of dot data which is expressed by either the existence or the non-existence of dots corresponding to the character codes in a form to be readable in accordance with character code data.

In some instances, both standard size characters and large size characters are required to be printed in the same document. To provide a printer that can meet this requirement, it is common to store the large size character dot pattern data in the same device that stores the standard size dot data. However, storing large size character dot pattern data, which are infrequently used, in the same device for storing the normal size character dot data increases the cost of the storage device because the storage circuit must have a larger storage capacity.

To solve this problem, the so-called outline font method was proposed. The standard size character pattern data is not stored in the form of dot data but as outline data representing outlines of the standard size characters. To print enlarged characters, the outline data is enlarged to the desired size by an arithmetic unit during printing and the outline data is converted into dot data. This method is advantageous because the amount of data to be stored is smaller and the storage capacity can be reduced.

Unfortunately, the outline font method requires a large number of arithmetic operations to convert the outline data into dot data. This is detrimental because either this method increases printing time or it requires a high speed arithmetic unit, which can be costly. To solve these problems, a method of using a standard size character dot pattern and multiplying each dot into a plurality of dots by a multiplying factor was proposed. For example, in the case of a 4-fold enlargement, each dot of the standard size dot pattern is converted into four dots.

To visualize how this method works, the printing area can be represented by a matrix of squares that contain or do not contain dots. Diagonal lines and curves are represented by a stepped pattern of squares containing dots. To yield a four-fold enlargement, each square, blank or filled is bisected in both the horizontal and vertical directions to yield four squares ((2×2)-fold enlargement). When the pattern is converted to an image, the "quarter size" squares are formed to be the size of the original squares. To yield a 9-fold enlargement, each original square is converted into nine squares.

This method is advantageous because the dot patterns of enlarged characters can be generated at a high speed by simple arithmetic operations without increasing the storage capacity. However, this method also has drawbacks. Curved or oblique appearing lines of the original dot pattern are actually formed in a stepped pattern, but the "steps" are too small to be noticeable. When performing this character enlargement method, the stepped portions shaping the oblique lines are enlarged by the same multiplying factor. This results in decreased character quality because the stepped nature of the lines becomes more noticeable.

To solve this problem, it was proposed to modify the method to smooth the oblique line patterns by increasing or decreasing the dots which form the oblique lines of the character dot patterns. Japanese Patent Application Laid-Open No. 60-014286 describes a dot pattern data generating device which incorporates a function to modify the dot patterns into smooth configurations. Each of the dots representing the standard character dot pattern is multiplied into a corresponding number of dots by the multiplying factor and a dot pattern for enlarging the character is generated.

A storage device stores all the patterns of the stepped portions of the oblique lines which are shaped when being enlarged and modifies the patterns in a dictionary format. The dot pattern outlines of the enlarged characters which are generated in the previous step are cut out and replaced with the corresponding modified patterns.

This method also has drawbacks. It requires substantial time until optimal modified patterns are output because of the necessity for reading the modified patterns by a so-called mask pattern matching retrieval method in which the outline dot patterns are compared with mask patterns prepared beforehand. In addition, the shape balance of the character as a whole is lost due to undesirable partial swelling or thinning of character portions, although smooth outline patterns can be attained because of the uniform replacement with the modifying patterns.

Conventional dot pattern data generators therefore have inadequacies due to these shortcomings. Accordingly, it is desirable to provide a improved dot pattern data generator which avoids the shortcomings of the prior art and yields properly shaped smooth characters and images of various sizes.

SUMMARY OF THE INVENTION

Generally speaking, in accordance with the present invention, a device for generating dot pattern data is provided in which characters and images of various sizes are formed with a high speed economical device. The device includes a character generator for storing data representing character patterns on the basis of the existence or the non-existence of dots constructed to be readable in accordance with character data. The device also includes a region readout circuit for reading out a portion of the character pattern read from the character generator with one specified dot location being essentially centered and an arithmetic circuit for computing horizontal and vertical values from the portion of the character pattern. The arithmetic values determine whether a portion of the character pattern is a stepped portion to be filled in and smoothed prior to the image formation. A pattern generating circuit is also included for generating a plurality of dots with respect to one dot of an original pattern on the basis of the horizontal and vertical values to form an enlarged dot pattern. Configurations of the dots shaping oblique lines such as left and down, right and up, left and up or right and down are judged from the horizontal and vertical values by arithmetic operations and dot existence data are supplemented to null data contiguous to the dots shaping the oblique lines. Accordingly, high quality character patterns of normal and enlarged sizes are generated at a high speed without expanding stepped portions of enlarged character patterns.

Accordingly, it is an object of the present invention to provide an improved device for generating dot pattern data for forming characters and images of normal and enlarged sizes.

Another object of the invention is to provide an improved dot pattern data generating device capable of modifying stepped portions of oblique lines of dot patterns, which are generated from dot patterns of standard size characters, to enlarge the characters at a high speed.

A further object of the invention is to provide a dot pattern data generating device capable of keeping the shape balance of enlarged characters which are generated from dot patterns of standard size characters.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a block diagram showing data processing in a printer including a dot pattern data generating device in accordance with the present invention;

FIG. 2 is a block diagram of a first embodiment of a dot pattern data generating device in accordance with the invention;

DESCRIPTION OF THE PREFERRED EMBODIMENTS

Figure 3:
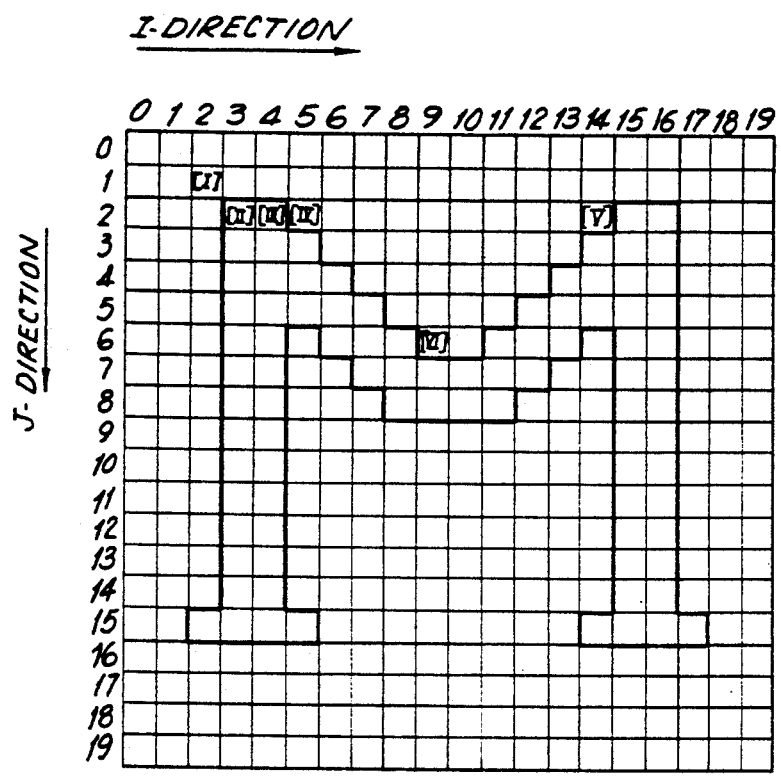
FIG. 3 is a diagram showing an example of dot pattern data of a standard size character.

FIG. 1 shows a block diagram of a dot pattern data generating device 50 in accordance with the present invention. Device 50 includes a microcomputer 1 that includes a central arithmetic processing unit, a RAM and a ROM. Microcomputer 1 judges character code data output from an external unit 2 such as a computer to an input buffer 3. Microcomputer 1 is programed to permit a printing mechanism to print dot data from a character generator 4 by reading the dot data directly to an output buffer 5 when printing standard size characters and to output signals for actuating an enlarged character pattern data generating unit 6 when printing enlarged size characters.

Characters corresponding to character codes specifying at least the standard size character patterns are stored in character generator 4 as dot data expressed by dot aggregations. Character generator 4 is constructed to be readable in accordance with the character code data received externally.

FIG. 2 shows a block diagram of enlarged character pattern dot data generating unit 6 which includes a process buffer 10 which receives a signal from character generator 4 and outputs a signal to a region readout circuit 11. Region readout circuit 11 outputs a signal to an I-directional arithmetic circuit 12, a J-directional arithmetic circuit 13 and a dot judging circuit 16 which outputs to a conversion pattern generating circuit 17. I-directional arithmetic circuit 12 and J-directional arithmetic circuit 13 output a signal to an X-value arithmetic circuit 14 and a Y-value arithmetic circuit 15, respectively and circuits 12, 13, 14 and 15 all output a signal to conversion pattern generating circuit 17.

Process buffer 10 is constructed to store the dot data or the standard size characters read by microcomputer 1 from character generator 4 when enlarged size characters are to be printed in accordance with the character code data. Region readout circuit 11 sequentially cuts out portions of the standard size dot data read to processing buffer 10 in (n×n) dot pattern portions.

A dot pattern for a normal size letter "M" is shown in FIG. 3. The letter "M" is represented by a matrix of filled in and blank squares representing dot locations. The readout central coordinate of a pattern portion of the matrix is expressed by (i, j). A position to the right of the central coordinate is denoted (i+1); to the left is (i−1); above is (j−1); and the below is (j+1). Accordingly, the coordinate above and to the left of the central coordinate is (i−1, j−1). A 3×3 pattern of dots surround the readout central coordinates while the central coordinate is sequentially moved dotwise from one end of the matrix to the other. The central coordinate can begin at the upper left corner and end at the lower right corner.

A relationship of f(i+k, j+l)=1 is prescribed if dot existence data are present in coordinates (i+k, j+l) of the character pattern portion. If no dot exists (null data are present), f(i+k, j+l)=0 is prescribed.

Figure 4:
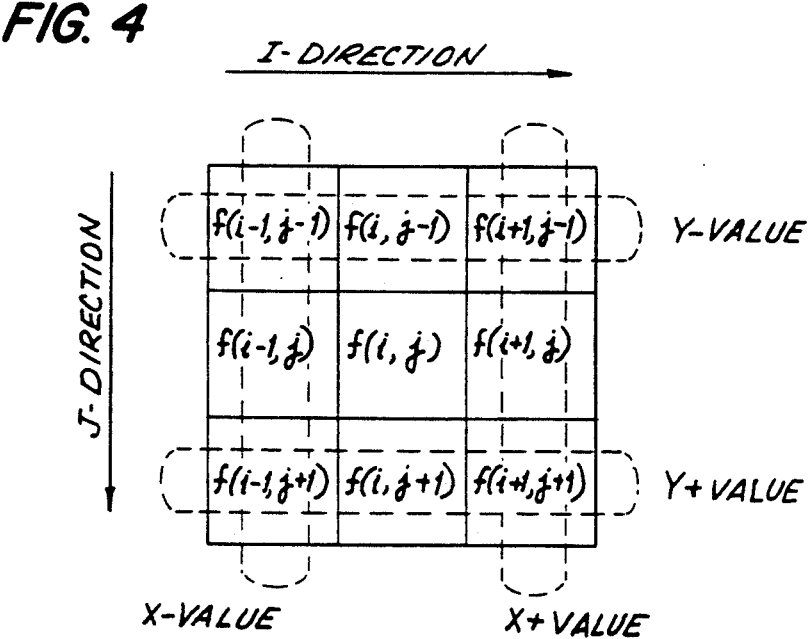
FIG. 4 is a diagram showing an arithmetic operation of an X-value/Y-value arithmetic circuit used for the dot pattern data generating device of the invention.
Figure 5A:
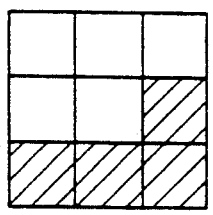
FIGS. 5(a), 5(b), 5(c) and 5(d) and 6(a), 6(b), 6(c) and 6(d) are diagrams each depicting an example of a dot pattern shaping an oblique line of a character pattern.
Figure 5B:
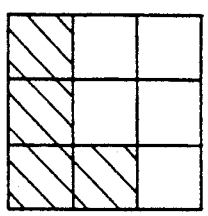
Figure 5C:
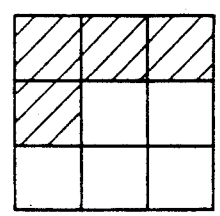
Figure 5D:
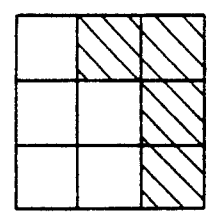

Referring to FIG. 4, I-directional arithmetic circuit 12 computes values of two sets of three j-directional coordinates: [(i−1, j−1), (i−1, j), (i−1, j+1)] and [i+1, j−1), (i+1, j), (i+1, j+1)] to compute values of X+ and X−. f(i−1, j−1)+f(i−1, j)+f(i−1 j+1) X− and f(i+1, j−1)+f(i+1, j) f(i+1, j+1) X+. I-directional circuit 12 then outputs these arithmetic results.

J-directional circuit 13 computes values of two sets or three I-directional coordinates: [(i−1, j−1) (i, j−1), (i+1, j−1)] and [(i−1, j+1), (i, j−1), (i+1, j−1)] to compute values of Y+ and Y−. f(i−1, j−1)+f(i, j−1)+f(i+1, j−1)=Y− and f(i−1, j+1)+f(i, j+1)+f(i+1, j+1)=Y+. J-directional circuit 13 then outputs these arithmetic results. X-value arithmetic circuit 14 outputs a difference X between a value X+ and a value X−, which is given by X=X+−X−. Y-value arithmetic circuit 15 outputs a difference Y between a value Y+ and a value Y−, which is given by Y=Y+−Y−.

Dot existence judging circuit 16 judges the existence and non-existence of dots at the readout central coordinate (i, j). Circuit 16 outputs "1" when a dot is present at (i, j) and "0" when no dot is present at (i, j).

As discussed above, a character pattern is expressed by dot aggregations. The oblique lines of the character pattern contain stepped portions which are not excessively noticeable in standard size characters but become pronounced when the characters become enlarged. Stepped portions of a character pattern are shown in FIGS. 5(a) through 5(d) and FIGS. 6(a) through 6(d). These stepped patterns as well as patterns that exhibit line and point symmetry thereto present print quality problems for conventional enlargement methods.

When generating the patterns for the enlarged characters, the null areas contiguous to the dots of the stepped portions are not always simply quadrupled. This could exaggerate the stepped nature of lines that are intended to be perceived as smooth. Smooth oblique lines can be shaped by replacing the pattern of the readout central coordinate of portions having stepped patterns shown in FIGS. 5(a) to 5(d) by the pattern framed by the heavy line shown in FIGS. 7(a) to 7(d). In the stepped portion patterns illustrated in FIG. 6, the null data of the readout central coordinates is replaced by the pattern framed by heavy lines of FIGS. 8(a) to 8(d). In FIGS. 7(a) to 7(d) and 8(a) to 8(d) the supplemented portion to which dots have been added is indicated by double hatching.

Conversion pattern generating circuit 17 judges types or standard size null data to be converted on the basis of the data received from I-directional arithmetic circuit 12, X-value arithmetic circuit 14, Y-value arithmetic circuit 15 and dot existence judging circuit 16 based on the results obtained from the patterns shown in FIGS. 5(a) through 5(d) and FIGS. 6(a) through 6(d). Based on these judgment results, conversion pattern generating circuit 17 generates a portion of a character pattern such as those shown in FIGS. 7(a) through 7(d) and FIGS. 8(a) through 8(d). The conversion pattern can be stored beforehand into the storage circuit in the dictionary format or generated by the arithmetic circuit. Operations of dot pattern data generating device 50 will be described in conjunction with the flowcharts of FIGS. 9, 10 and 11.

Figure 9:
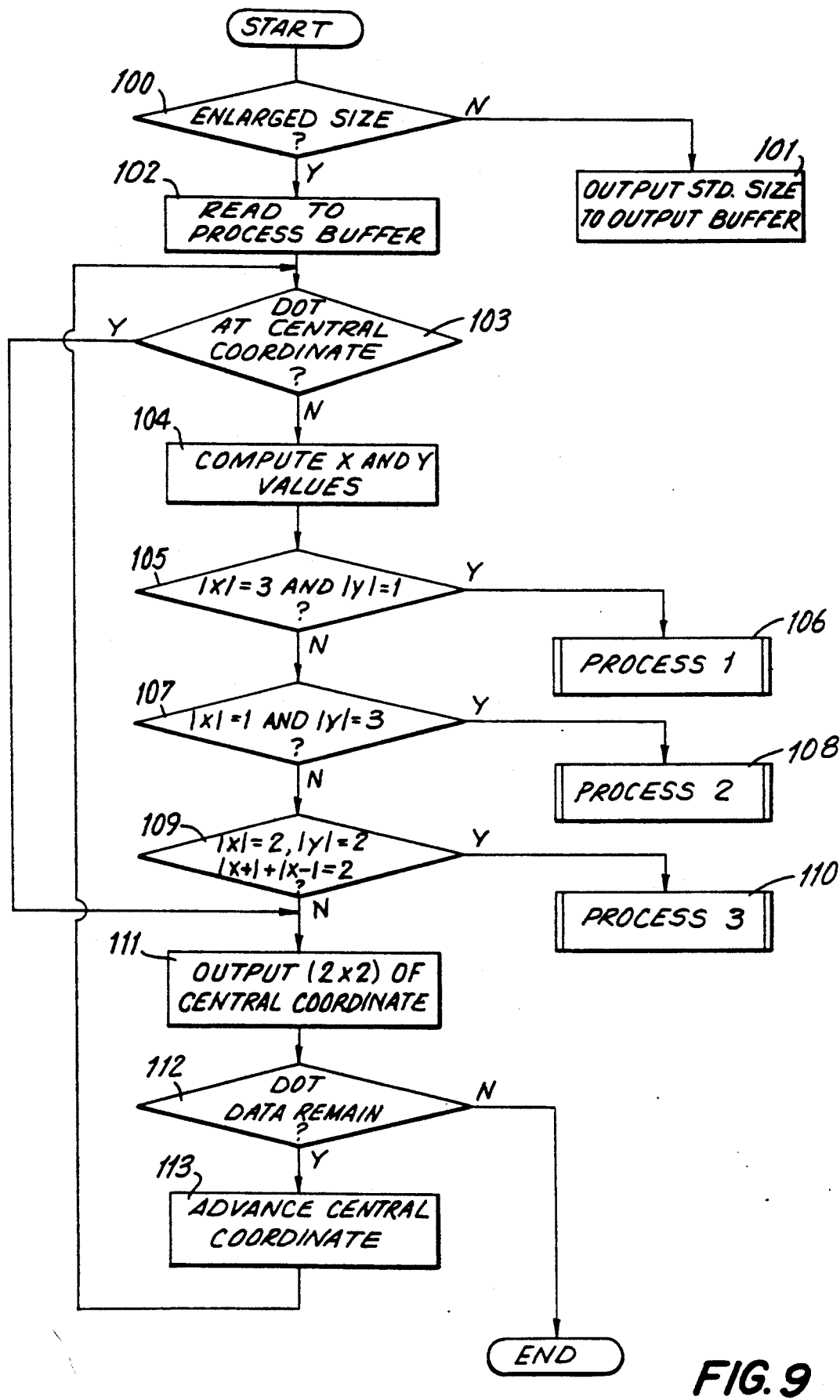
FIGS. 9, 10, 11 and 12 are flowcharts showing operations of the device shown in block diagram form in FIG. 2.

Referring to FIG. 9, in a step 100 it is determined if enlarged size print is selected. If it is not, in a step 101, output buffer 5 will output standard size dot data. Otherwise, in a step 102 the character data is read to the process buffer and in a step 103 it is determined if dot exists at the readout central coordinate. If a dot is present, step 111 is initiated. Otherwise, in a step 104, the values of X−, X+, X, Y−, Y+ and Y are computed and a step 105 is initiated.

In step 105, it is determined if the absolute value of X is 3 and the absolute value of Y is 1. If this is true, process 1 is initiated in a step 106. If it is not true, in a step 107, it is determined if the absolute value of X is 1 and the absolute or Y is 3. If this is true, a step 110 initiates a process 2. Otherwise, in a step 109, it is determined if $|X|=2$ and $|Y|=2$ and $|X+"+|X-|=2$. If these conditions are met, a step 110 initiates a process 3.

If the conditions of steps 105, 107 or 109 are not met, in a step 111 the dot data of the readout central coordinate is output in the enlargement multiple. For a fourfold enlargement, it will be output as (2×2)-fold dot data. A step 112 follows in which it is determined whether dot data to be processed is present. If it is not, this series of steps shown in FIG. 9 come to an end. Otherwise, the readout central coordinate is advanced dotwise by 1 in a step 113 and the steps are repeated, beginning with step 103.

The character shown in FIG. 3 would be processed as follows. In step 100 if the character code data output from external unit 2 command a standard size print, microcomputer 1 accesses character generator 4 on the basis of the character code data stored in input buffer 3 and in step 101 reads out the standard size dot data corresponding to the character codes to output buffer 5. The dot forming elements are then operated on the basis of the dot data to print standard size characters according to the dot pattern.

In step 100, if the character code data output from external unit 2 command enlarged print such as e.g., four times as large as the standard size, in step 102, microcomputer 1 reads out the standard size dot data pattern corresponding to the character codes from character generator 4 to process buffer 10. Region readout circuit 11 reads the data of a character pattern portion of (3×3) dots from process buffer 10 with the coordinate (i, j) being centered in the 3×3 matrix while moving the readout coordinate dotwise to the next position in a predetermined order, such as from the left upper corner defined by (i, j) =(0, 0) in FIG. 3, for example.

If the readout central coordinate is at the left upper corner, the dot value is "0". Therefore, in step 103, signals "0" are output from dot existence judging circuit 16. When no dot is present at the readout central coordinate, this implies a possibility that the central coordinate is null data contiguous to dots shaping an oblique line, and if so, the null portion might have to be filled in. To determine if this is necessary, in step 104, X-value arithmetic circuit 14 and Y-value arithmetic circuit 15 compute values X and Y. In this case, the values of $f(i-1, j-1)+f(i-1, j)+f(i-1, j+1)=X-$ and $f(i+1, j-1)+f(i+1, j)+f(i+1, j+1)=X+$ are "0", and the values of $f(i-1, j+1)+f(i, j+1)+f(i+1, j+1)=Y+$ as well as $Y-$ are "0".

Hence, X-value arithmetic circuit 14 and Y-value arithmetic circuit 15 output the values "0". Because this does not correspond to step 105 requiring $X=3$ and $Y=1$, step 107 requiring $|X|=1$ and $|Y|=3$ step 109 requiring $|X+|+|X-|=2$ and $|X|=2$ and $|Y|=2$, conversion pattern generating circuit 17 jumps over to step 111. Circuit 17 outputs the dot data of the readout central coordinate to output buffer 5; in this case (2×2) pieces of null data "0" which is two lines of "0", each line consisting of two pieces of data. As a result, the data for the readout central coordinate (0, 0) are converted into four pieces (2×2) of null data, whereby the data are enlarged four times.

In step 112, because dot data are still present in step 113 the readout central coordinate is moved by one address to the next dot position location in the I-direction from process buffer 10 and step 103 is initiated.

If the requirements of steps 105, 107 or 109 had been met, this would cause a plurality of steps 106, 108 and 110, respectively, to initiate a plurality of processes 1, 2 or 3 respectively, to fill in and smooth enlarged step regions of the normal size character dot pattern.

Figure 10:
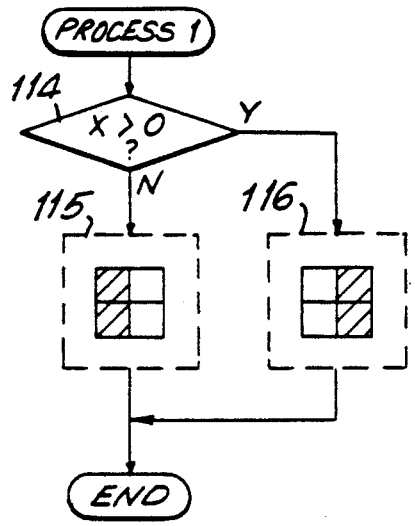
Figure 11:
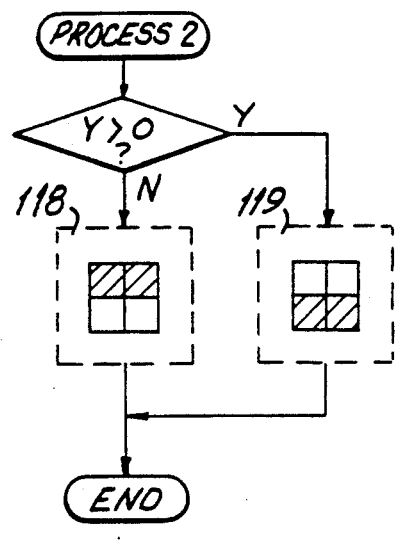

Referring to FIG. 10, in process 1, in a step 114, it is determined if X is positive. If X is positive, a pattern shown in a step 116 will be output. If X is negative, a pattern shown in a step 115 will be output. Referring to FIG. 11, in process 2, in a step 117 it is determined if Y is positive. If Y is positive, a pattern shown in a step 119 will be output. If Y is not positive, a pattern shown in a step 118 will be output.

Figure 12:
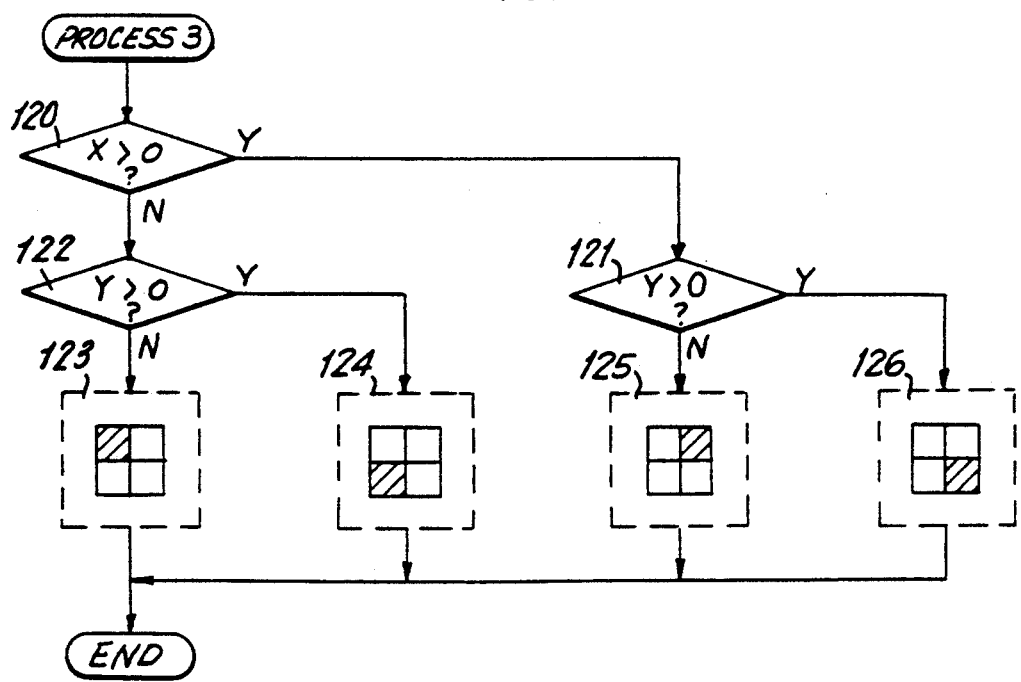

Process 3 is initiated when only on dot is to be added to a quadrupled null data dot location. Referring to FIG. 12, in a step 120, it is determined if X is greater than 0. If X is positive, a step 121 is initiated and if X is not positive, a step 122 is initiated. In step 122, it is determined if Y is greater than 0. If it is, the pattern depicted in a step 124 is output and if Y is not >0, the pattern depicted in a step 123 is output. In step 121, it is determined if Y is greater than 0. If it is, the pattern depicted in a step 126 is output and if Y is not >0, the pattern depicted in a step 125 is output.

In the standard size character pattern depicted in FIG. 3, the readout central coordinate advances through the dot locations of the matrix, the values of X and Y are identical ("0") to those of coordinate (0, 0) and the steps are repeated in the same manner as described above through coordinate (1, 1). Therefore, conversion pattern generating circuit 17 outputs the null data of the readout central coordinate after simply quadrupling the null data.

Figure 13A:
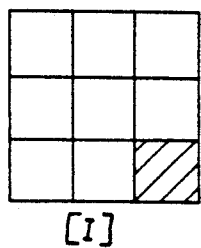
FIGS. 13(a), 13(b), 13(c), 13(d), 13(e) and 13(f) are diagrams showing a pattern portion cut out from a standard size character pattern by a region readout circuit.

When the readout central coordinate next moves to (i, j) =(2, 1), region [I] in FIG. 3, region readout circuit 11 outputs a pattern including dot existence data "1" at the lower right position of the 3×3 matrix as shown in FIG. 13(a). This pattern in which the value of $X-$ is "0", $X+$ is "1" and X is "1" and the value of $Y-$ is "0", $Y+$ is "1" and Y is "1", does not correspond to any of steps 105, 107 and 108. Therefore, in step 111, conversion pattern generating circuit 17 outputs (2×2) fold null data corresponding to the data of dot existence judging circuit 16. This is not an empty dot location adjacent an oblique line to be filled in to smooth the stepped nature of the line.

The readout central coordinate then moves to (3, 2) in step 113 and later to (4, 2), corresponding to regions [2] and [3] of FIG. 3 and region readout circuit 11 cuts out the patterns shown in FIGS. 13(b) and 13(c). These patterns have dot existence data "1" at the respective readout central coordinates. Accordingly, these dot locations are not empty portions to be partially filled in. A dot exists at the readout central coordinate which satisfies the conditions of step 103. Conversion pattern generating circuit 17 therefore jumps over to step 111 wherein circuit 17 outputs (2 ×2) - fold dot existence data "1" which coincide with the judgment results of dot existence judging circuit 16.

Figure 13B:
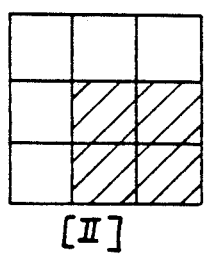
Figure 13C:
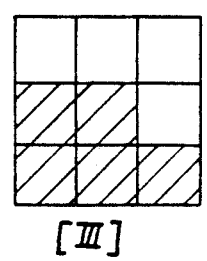
Figure 13D:
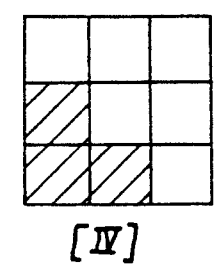

The readout central coordinate (i, j) then shifts to (5, 2), in step 113 region [IV], and region readout circuit 11 cuts out the pattern depicted in FIG. 13(d). A dot does not exist at the readout central coordinate of this pattern and the values of X and Y are computed in step 104. The value of $X-$ is "2", $X+$ is "0" and X is "$-2$" and the value of Y is "2". Conversion pattern generating circuit 17 refers to the values X and Y in step 104. The requirements of steps 105 and 107 are not met but because $|X-|+|X+|=2$ and $|X|=|Y|=2$, the conditions of step 9 are established. Consequently, in step 110 the program proceeds to a process 3.

Figure 6A:
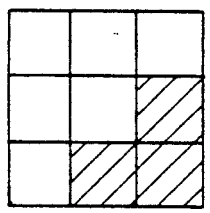
Figure 6B:
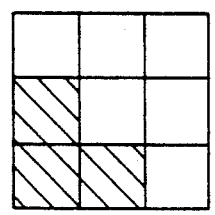
Figure 6C:
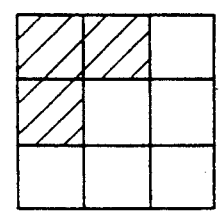
Figure 6D:
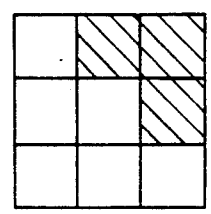
Figure 7A:
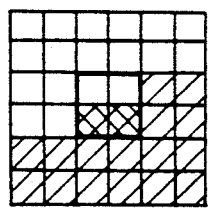
FIGS. 7(a), 7(b), 7(c) and 7(d) and FIGS. 8(a), 8(b), 8(c) and 8(d) are diagrams illustrating modified dot patterns output when enlarging the dot patterns of FIGS. 5(a) through 5(d) and FIGS. 6(a) through (d) respectively.
Figure 7B:
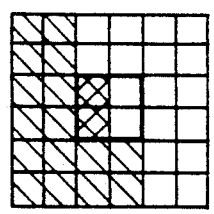
Figure 7C:
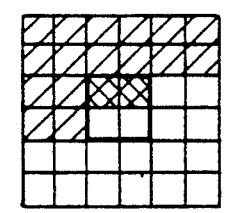
Figure 7D:
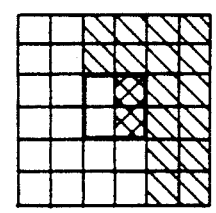
Figure 8A:
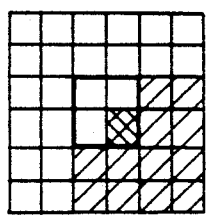
Figure 8B:
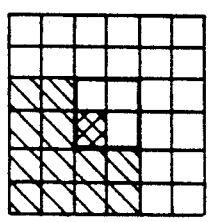
Figure 8C:
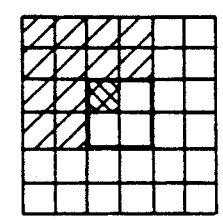
Figure 8D:
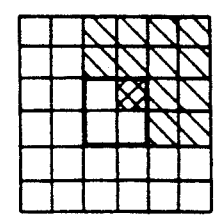

In process 3, the value of X is negative in step 120 and the value of Y is positive in a step 122. Therefore, conversion pattern generating circuit 17 outputs the pattern of step 124, i.e., including dot existence data at the left lower corner of what would have been a 2×2 matrix of null data. As a result of the foregoing steps, the null data contiguous to the stepped portion depicted in FIG. 6(b) are converted into the pattern shown in FIG. 8(b). One dot is added to a portion which would have been multiplied into a (2×2) null area to yield a dot pattern representing a smooth oblique line.

Pattern judgment is then made by sequentially moving the readout central coordinate from (6, 2) to (13, 2) is repeated steps 113. On this route, the requirements of steps 105, 107 and 109 are not be fulfilled and therefore conversion pattern generating circuit 17 outputs (2×2) null data.

Figure 13E:
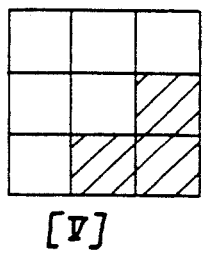

When the readout central coordinate (i, j) moves to (14, 2). region [V], a pattern shown in FIG. 13(e) is given from region readout circuit 11. The value of X is "2", the value of Y is "2" and a relationship of $|X-|+|X+|=2$ is valid. Hence, in step 109 conversion pattern generating circuit 17 selects process 3 by step 110. In step 120 the value of X is positive, and in step 121 the value of Y is positive so that the pattern of step 126 is selected. Accordingly, the stepped pattern depicted in FIG. 6(a) is converted into that of FIG. 8(a) to generate a dot pattern for a smooth line.

Conversion pattern generating circuit 17 converts null data positions (6, 3), (7, 4), (8, 5) and (13, 3), (12, 4), (11, 5) which border on the stepped portions into the pattern of a step 124 or 126 which, as described above, consist of a single piece of dot existence data and three pieces of null data in a 2×2 matrix.

Figure 13F:
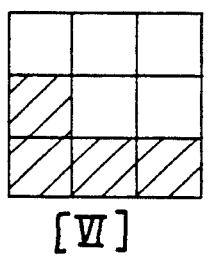

When the readout central coordinate shifts to (9, 6) (region [VI]), a pattern illustrated in FIG. 13(f) is read from region readout circuit 11. In this pattern, the value of X is "$-1$" and the value of Y is "3". This satisfies the condition of step 107 and in step 108 initiates process 2 in step 108. Referring to FIG. 11, because in step 117 the value of Y is positive conversion pattern generating circuit 17 selects a pattern of a step 119 for the quadrupled null data location.

If the readout central coordinate is the null data "0" and borders on dot existence data "1", such as in the patterns shown in FIGS. 5(a) to 5(d) or 6(a) to 6(d) the null data of the central coordinate is not simply quadrupled to enlarge the step pattern shown in these figures. Rather, by steps 103 to 126, based on a judgment result, the patterns of steps 115, 116, 118, 119, 123 through 126 are selected, and patterns such as in FIGS. 7(a) to 7(d) or 8(a) to 8(d) in which the dots are supplemented to null areas are output. The judgment for determining the pattern mode of the null areas is executed by a numerical value arithmetic operation. This is attained with very high-speed processing compared with a pattern matching method which involves the use of a pattern mask.

Figure 14:
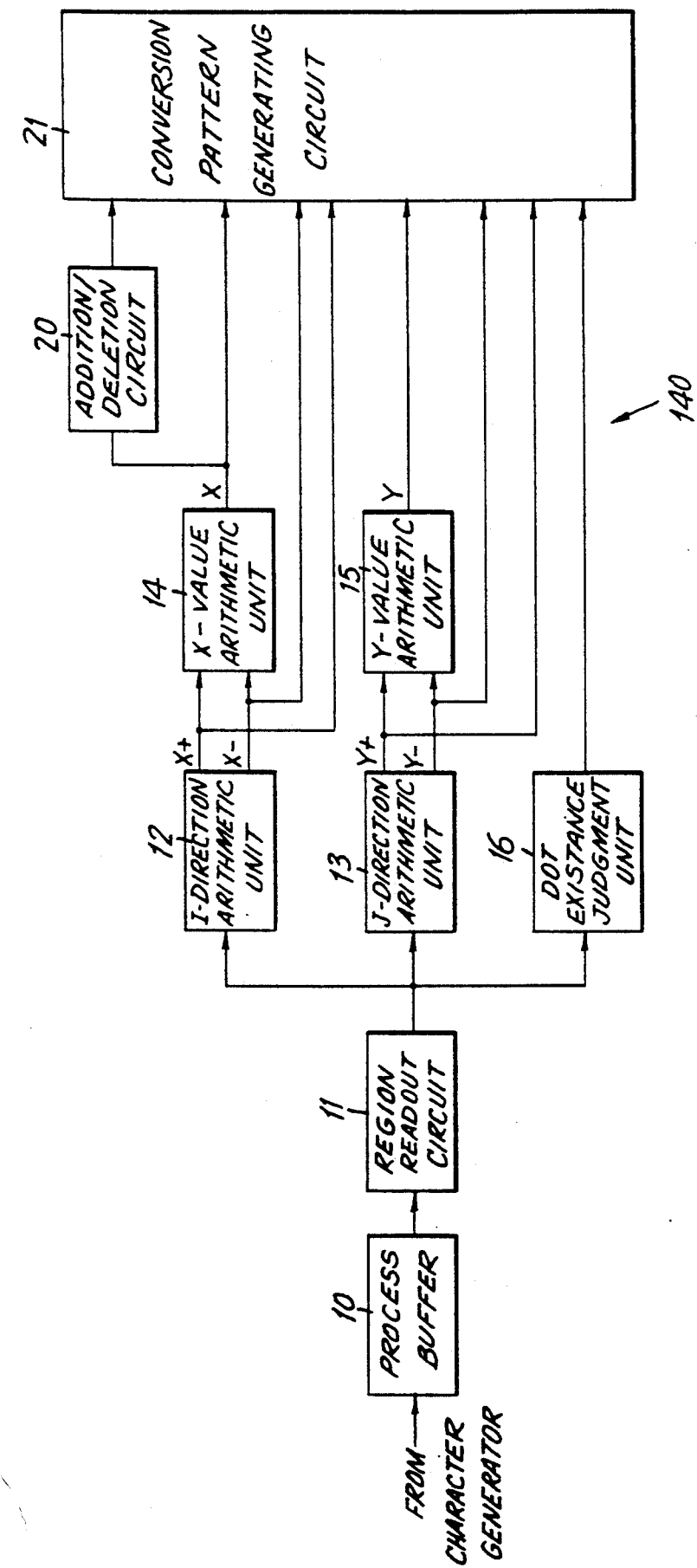
FIG. 14 is a block diagram showing a second embodiment of a dot pattern data generating device in accordance with the invention.
Figure 17:
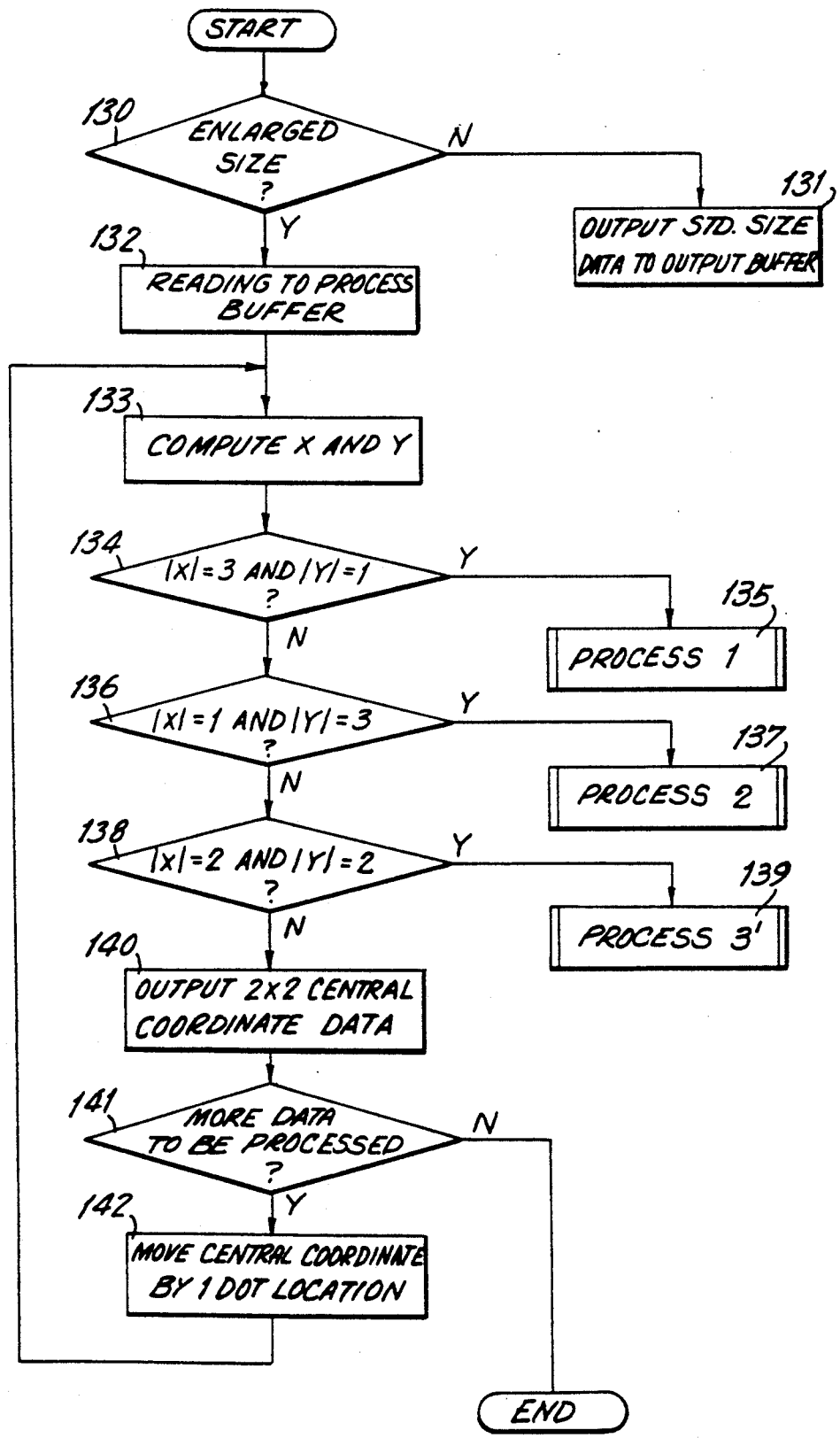
FIGS. 17, 18, 19 and 20 are flowcharts each showing operations of the dot pattern data generating device depicted in block diagram form in FIG. 14.

FIG. 14 shows an enlarged pattern dot data generating device 140 in accordance with a second embodiment of the invention. In device 6 of the first embodiment, if a stepped portion is present, a conversion pattern in which dot data is added to a null area contiguous to the stepped portion is generated. In data generating device 140, the addition or deletion of dots can be regulated depending on certain conditions. Device 140 is constructed similar to device 6, but includes an addition/deletion determining circuit 20 to select the deletion or addition of dots to dot locations where null data locations border stepped portions. Throughout the application, similar elements are assigned the same reference numerals.

Device 140 also includes a conversion pattern generating circuit 11 which detects the patterns depicted in FIGS. 15(a) through 15(d) and the patterns which exhibit point and line symmetry with respect thereto, among the dot patterns which shape oblique lines. Circuit 21 detects these patterns on the basis of data sent from I-directional arithmetic circuit 12, X-value arithmetic circuit 14, Y-value arithmetic circuit 15, dot existence judging circuit 16 and addition/deletion determining circuit 20. Subsequent to this step, circuit 21 converts the detected patterns into patterns framed by heavy lines of FIGS. 16(a) to 16(d) and into the patterns which have point and line symmetry with respect thereto. The operations of device 140 will be described with reference to the flowcharts of FIGS. 17 to 20.

When the character code data output from external unit 2 command a print of standard size in a step 130, microcomputer 1 accesses character generator 4 on the basis of the character code data stored in input buffer 3 and reads out the standard size dot data corresponding to the character codes to output buffer 5 in step 131. Dot forming elements are operated, based on this data, to form standard size characters according to the dot pattern.

If in step 130, character code data output from external unit 2 command print of a size which is, e.g., four times as large as the standard size, microcomputer 1 reads out the standard size dot data corresponding to the character codes from character generator 4 to process buffer 10 in step 132. Region readout circuit 11 reads the data from process buffer 10, while advancing the readout coordinate dotwise in a predetermined order. For example, this can be from the left upper corner defined by (i, j) =(0, 0) to the bottom right corner.

In a step 133, the values of X−, X+, X, Y−, Y+ and Y are computed. In a step 134, it is determined if X=3 and Y=1. If this is true, process 1 is initiated in a step 135. Otherwise, in a step 136, it is determined if $|X|=1$ $|Y|=3$. If this is true, process 2 is initiated in a step 137.

Otherwise, in step 138 it is determined if $|X|=2$ and $|Y|=2$. If this condition is met, process 3' is initiated in a step 139.

If none of these conditions of steps 34, 136 or 138 are met, in a step 140 the multiple dot data corresponding to the factor of enlargement, such as four-fold, of the readout central coordinate is output. Thereafter, in a step 141, if there are no more dot locations to be processed, this series of steps comes to an end. If there are more dot locations, in a step 142, the readout central coordinate is advanced one location address and these steps are repeated, beginning with step 133.

Figure 18:
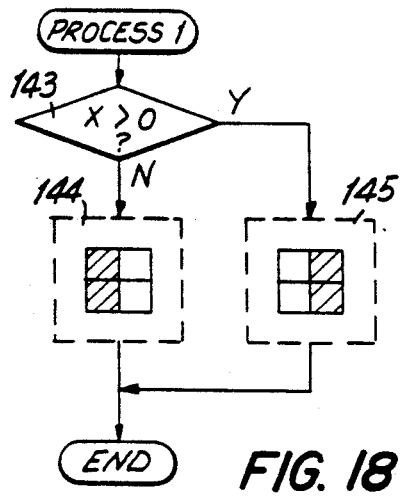
Figure 19:
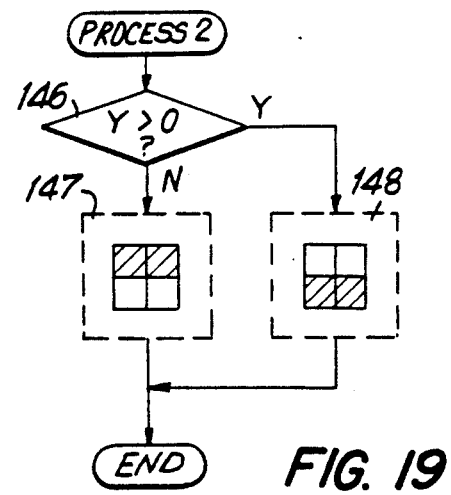

Referring to FIG. 18, in process 1, in a step 143 it is determined if X is positive. If X>0, a pattern shown in a step 145 is output and if not a pattern shown in a step 144 is output. Referring to FIG. 19, in process 2, in a step 146 it is determined if Y is positive. If Y>0, the pattern shown in a step 148 is output and if not, the pattern shown in a step 147 is output.

Figure 20:
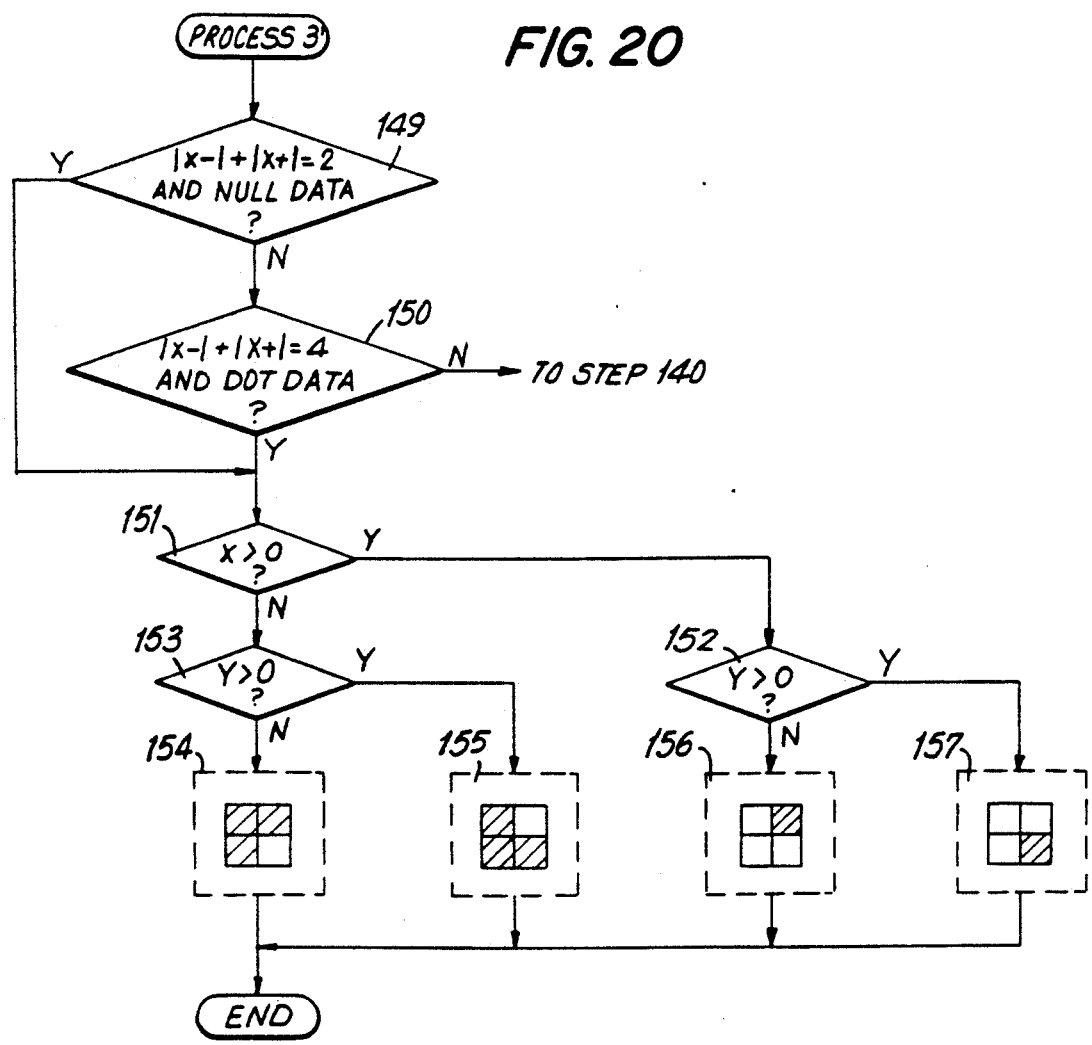

Referring to FIG. 20, in process 3', in a step 149 it is determined if $|X-|+|X+|=2$ and the readout central coordinate is the null data. If these conditions are met, a step 151 is initiated.

Otherwise, in a step 150, it is determined if the conditions of $|X-|+|X+|=4$ and the readout central coordinate is dot existence data are met. If they are not met, step 140 is initiated. Otherwise, in step 151, it is determined if X is positive. If X>0 a step 152 is initiated but if X is not positive, a step 153 is initiated. In step 152, it is determined if Y>0. If it is, a pattern shown in a step 157 is output but if Y is not, a pattern shown in a step 156 is output. In step 153, it is determined if Y is positive. If Y >0, a pattern shown in a step 155 is output but if is not greater than 0, a pattern shown in step 154 is output.

Referring to FIG. 3, where the readout central coordinate is present at the left upper corner, the values of f(i−1, j−1)+f(i−1, j)+f(i−1, j+1)=X− and f(i+1, j−1)+f(i+1, j)+f(i+1, j+1)=X+ are "0", and the values of f(i−1, j+1)+f(i, j+1)+f(i+1, j+1)=Y+ as well as Y− are "0". Hence, X-value arithmetic circuit 14 and Y-value arithmetic circuit 15 output the values "0" in step 133. For this reason, conversion pattern generating circuit 21 jumps over to step 140, wherein circuit 21 outputs the multiplied null data values of dot existence judging circuit 16.

At (i, j) =(0, 0), this would be null data of (2×2) dots, because a value of "no dot" is present. The null data constituting the coordinate (i, j) are therefore converted into the (2×2) null data. In step 141, because dot data still remain in a step 142 the readout central coordinate is moved by one address in the I-direction from the process buffer 10 and the abovementioned steps are repeated.

When the readout central coordinate moves to (i, j)=(2, 1) (region [I]), a pattern depicted in FIG. 13(a) is output as a cut-out character pattern portion by region readout circuit 11. Because the values of X and Y in this pattern portion are "1" the conditions of steps 134, 136 and 138 are not met and conversion pattern generating circuit 21 jumps to step 140. Value "0" is output from dot existence judging circuit 16 leading to en enlarged output of (2×2) null data.

When the central coordinate (i, j) moves to (3, 2) (region [II]), region readout circuit 11 reads a pattern illustrated in FIG. 13(b). In this pattern, the absolute value of X is "2", and the absolute value of Y is "2".

Hence, pattern generating circuit 21 jumps to step 138 and enters process 3.

At (i, j) =(3, 2) all of the conditions of steps 149 and 150 are not fulfilled. In step 149, the null data is not present at the central coordinate and in step 150, the absolute value of X+ plus the absolute value of X− does not equal 4. Circuit 21 therefore jumps to step 140, wherein (2×2) - fold dot existence data "1" are generated on the basis of the values given from dot existence judging circuit 16. Consequently, enlarged dot pattern data dot at location (3, 2) was obtained by quadrupling the dot existence data of readout central coordinate (3, 2).

The readout central coordinate then shifts by one to (4, 2) (region [III]) in step 142. Region readout circuit 11 cuts out the pattern shown in FIG. 13(c). In this pattern, the absolute value of X is "1", and the absolute value of Y is "3". Pattern generating circuit 21 therefore jumps to step 136 and initiates process 2. In step 146, Y is positive and pattern generating circuit 21 outputs a pattern specified in step 148 in which a higher line is null and two dots are provided in the lower line. The pattern is symmetric to the pattern within the heavy frame line in FIG. 16(c).

Figure 15A:
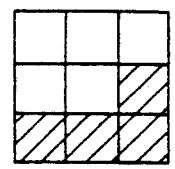
FIGS. 15(a), 15(b), 15(c) and 15(d) are diagrams each illustrating a dot pattern which forms an oblique line of a standard character pattern.
Figure 15B:
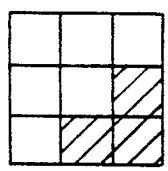
Figure 15C:
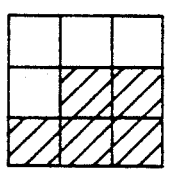
Figure 16A:
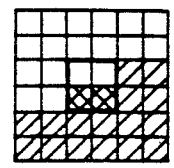
FIGS. 16(a), 16(b), 16(c) and 16(d) are diagrams showing dot patterns output when enlarging the dot patterns of FIGS. 15(a) through 15(d) respectively.
Figure 16B:
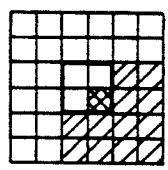
Figure 16C:
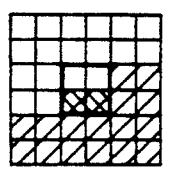
Figure 16D:
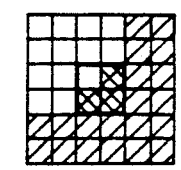

Accordingly, conversion pattern generating circuit 21 detects a pattern which is symmetric with respect to that of FIG. 15(c) and outputs a conversion pattern suited to gradually fill up the stepped portions shaped by the front and rear dots to yield a pattern that is symmetric to that of FIG. 16(c).

When the central coordinate moves to (5, 2) (region [IV]), region readout circuit 11 cuts out a pattern depicted in FIG. 13(d). The absolute value of X of the pattern is "2", and the absolute value of Y is "2". Pattern generating circuit 21 jumps to step 138 and enters process 3'.

In process 3', a judgment is made whether the dots forming the readout central coordinate shape an oblique line on the entire character pattern or at an intersection, corresponding to step 149 and step 150. If the dots form an intersection which is not to be smoothed during enlargement, the conversion is hindered by addition/deletion determining circuit 20 and a (2×2) pattern is generated in step 140, thereby preventing an imbalance as a whole.

At position (5, 2), region [IV], $|X-|+|X+|=2$ and the null data "0" is output from dot judging circuit 16. Accordingly, the conditions of step 149 are met and pattern generating circuit 21 jumps to step 151. In step 151, the value of X is "−2" which is less than 0 which leads to step 153. In step 153, the value Y is "2" which is greater than 0 so that a pattern indicated by step 155 is output.

When the dot data of the readout central coordinate (i, j) is the null data "0" and in the case of FIGS. 15(a) and 15(b) wherein dot data "1" exist in two directions, enlargement is effected in accordance with a pattern in which single piece of dot existence data is added to the previously null region to border the dot existence data, as illustrated within the heavy frame line in FIGS. 16(a) and 16(b).

Figure 15D:
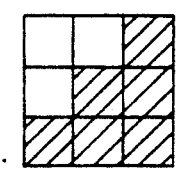

When the dot data of the readout central coordinate is "1" as in the case shown in FIGS. 15(c) and 15(d) and the dot existence data are present in two directions, (2×2) basis outputting of dot existence data is not performed. Rather, the pattern is enlarged but the dot existence data border on the null side is deleted from the (2×2) dot existence data as shown within the heavy frame line in FIGS. 16(c) and 16(d).

In accordance with this second embodiment, during enlargement, not only can the null data contiguous to the dot existence data be modified but the dot existence data bordering on the null data can also be modified. It is therefore possible to obtain a still smoother enlarged pattern due to reduction in the stepped nature of portions of the oblique lines that are enlarged.

Figure 21:
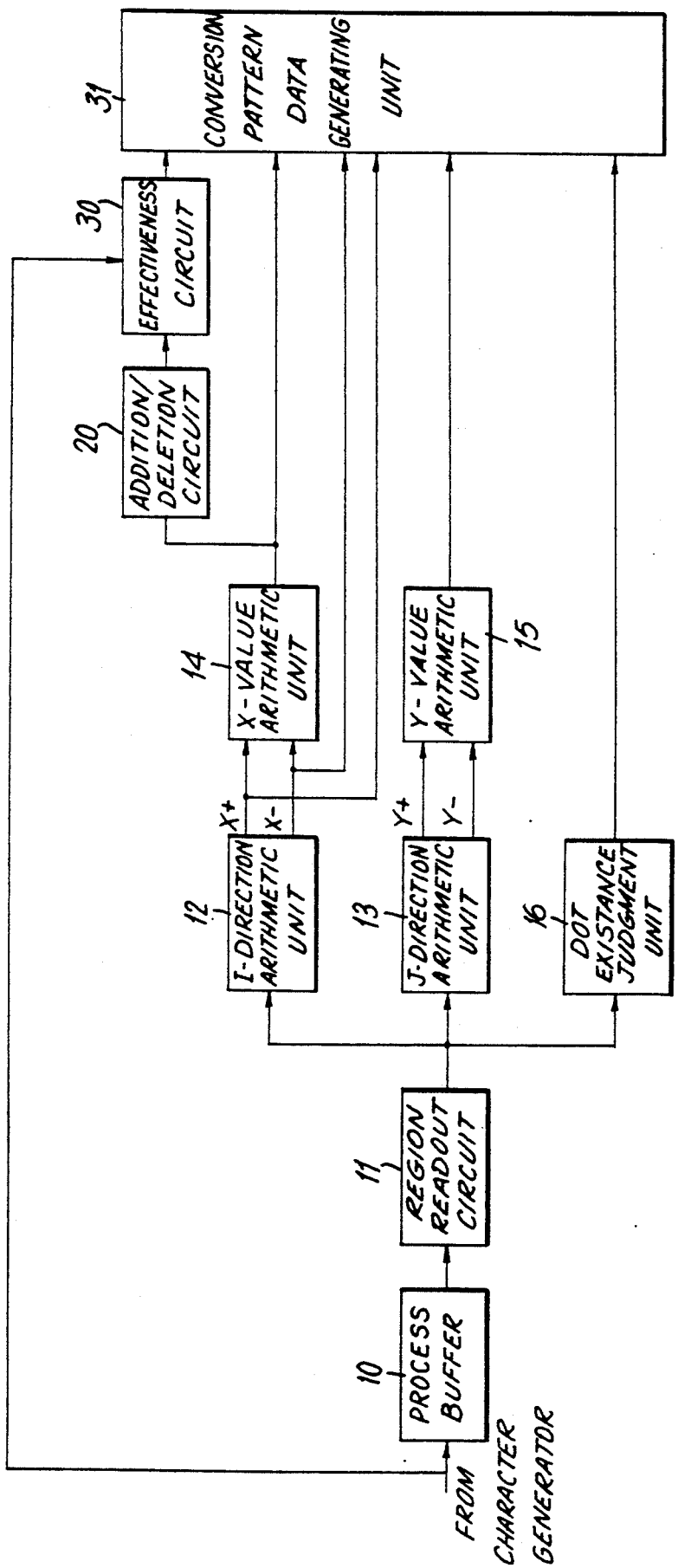
FIG. 21 is a block diagram showing a third embodiment or a dot pattern data generating device in accordance with the invention.

A dot pattern data generating device 210 according to a third embodiment the present invention is illustrated in FIG. 21. Pattern data generating device 210 is formed by incorporating an effectiveness/ineffectiveness selecting circuit 30 into data generating device 140. Effectiveness/ineffectiveness selecting circuit 30 is included to control enlargement patterns according to different character types such as ordinary characters clear-cut or Gothic characters, for example.

Effectiveness/ineffectiveness selecting circuit 30 judges the character types of process buffer 10. In the case of Gothic type characters that are shaped by lines having uniform thickness, the data imparted from addition/deletion circuit 20 are input to a conversion pattern generating circuit 31. When forming an ordinary character, e.g., a clear-cut style character that is formed of thin lines in which the thickness of different segments can vary, the data given from addition/deletion circuit 20 are hindered from being input to conversion pattern generating circuit 31.

Conversion pattern generating circuit 31 detects the patterns depicted in FIGS. 16(a) through 16(d) and the patterns which exhibit point and line symmetry with respect thereto, among the dot patterns which shape oblique lines. Conversion pattern generating circuit 31 operates on the basis of data from I-direction arithmetic circuit 12, X-value arithmetic circuit 14, Y-value arithmetic circuit 15, dot existence judging circuit 16 and addition/deletion determining circuit 20. After this step, circuit 31 converts the detected patterns into patterns framed by heavy lines of FIGS. 16(a) to 16(d) and into patterns which have point and line symmetry with respect thereto. The operations of device 210, will hereinafter be described with reference to the flowcharts of FIGS. 22 and 23.

In a step 160, it is determined whether enlarged characters are to be printed. When the character code data output from external unit 2 command standard size print, in a step 160, microcomputer 1 accesses character generator 4 on the basis of the character code data stored into input buffer 3 and reads out standard size dot data corresponding to the character codes to output buffer 5 in a step 161. On the basis of the dot data, dot forming elements are operated to form standard size characters.

If in step 160, the character code data output from external unit 2 command enlarged print such as e.g., four times as large as the standard size, microcomputer 1 reads out the standard size dot data corresponding to the character codes from character generator 4 to process buffer 10 in step a 162. Region readout circuit 11 reads the data from the process buffer 10, while deviating the readout coordinate dotwise in the right direction in a predetermined order, for example, from the left upper corner defined by (i, j) =(0, 0).

Figure 22:
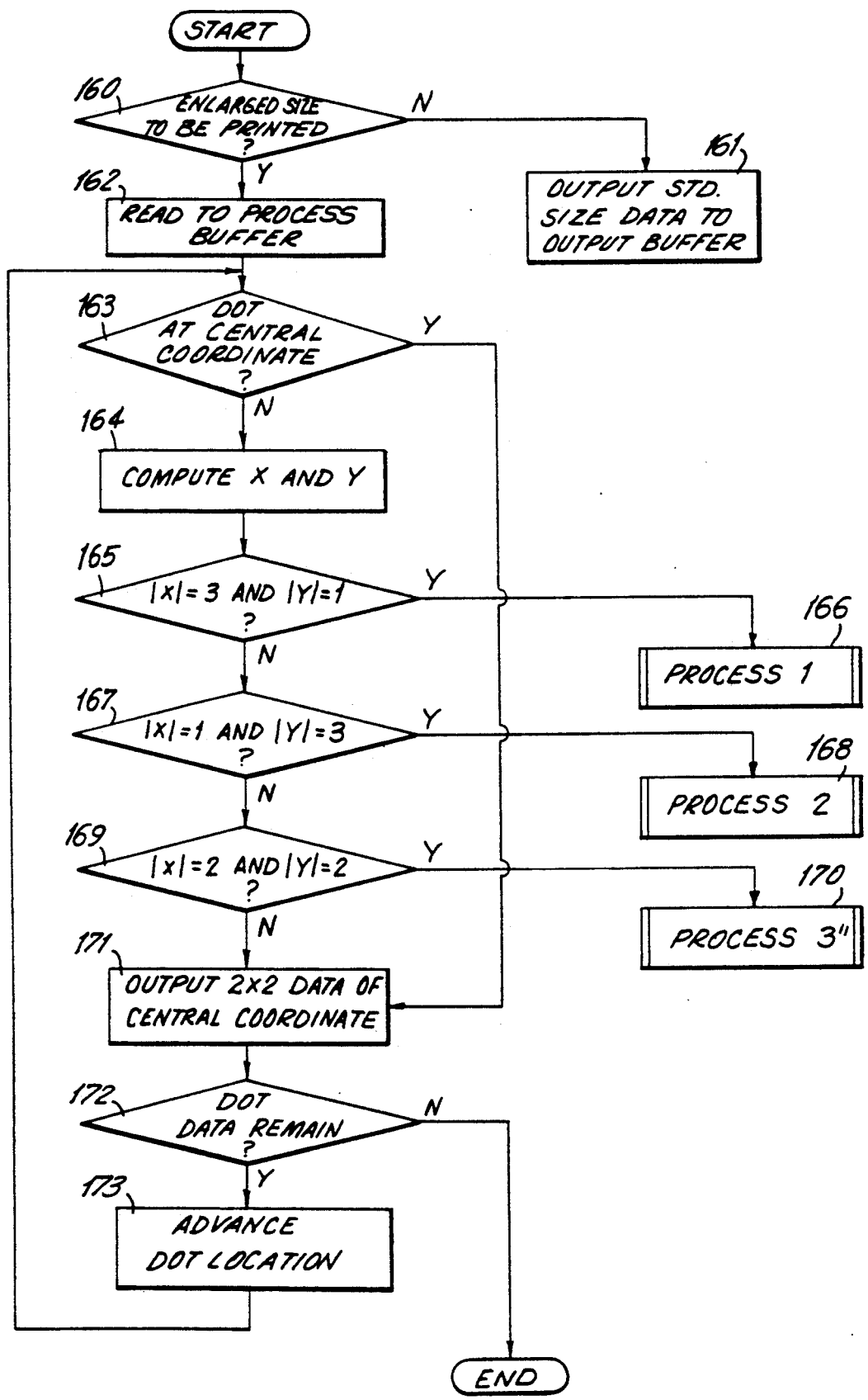
FIGS. 22 and 23 are flowcharts showing operations of the dot pattern data generating device depicted in block diagram form in FIG. 21.
Figure 23:
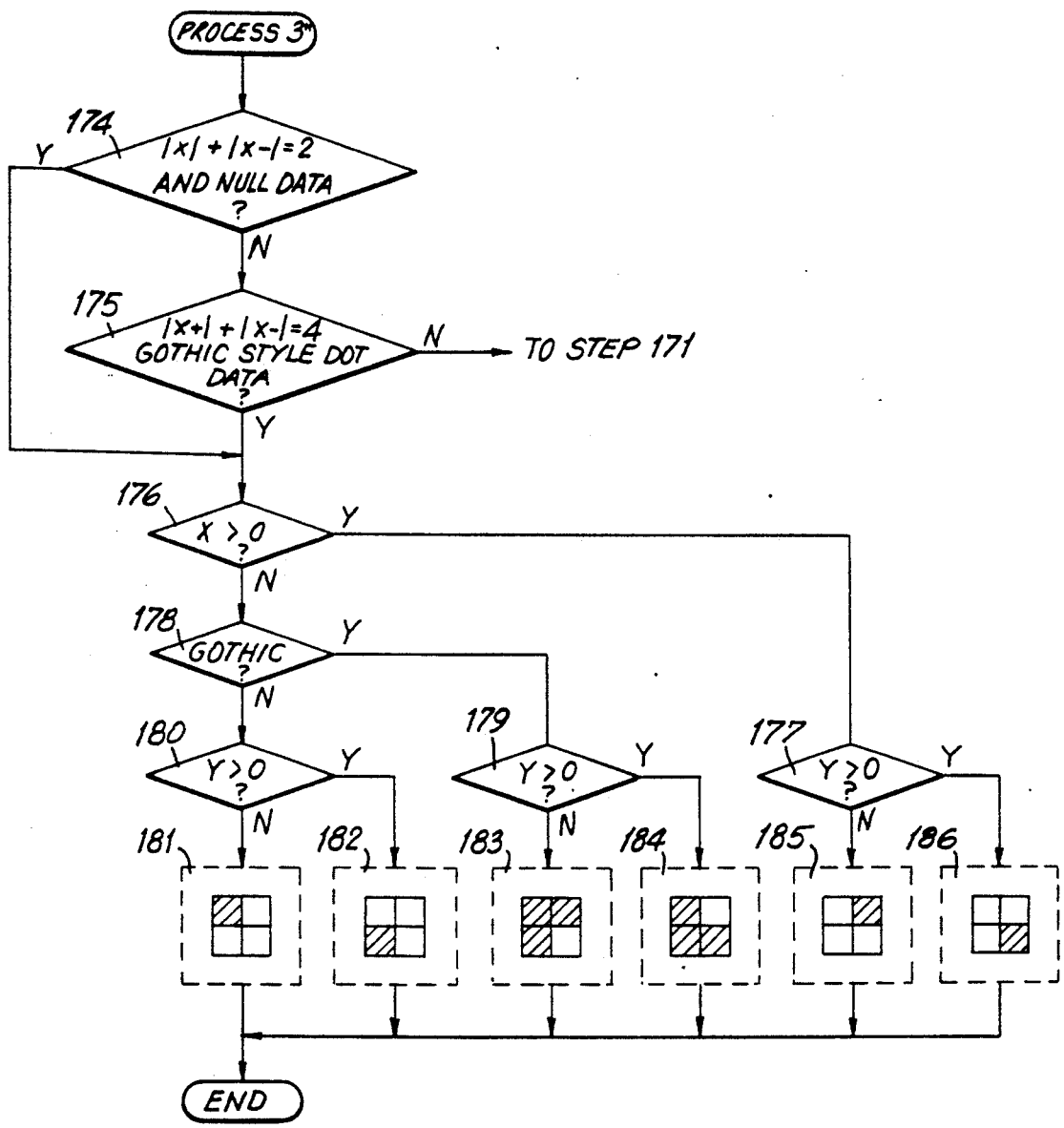

Referring to FIG. 22, in a step 163, it is determined if dot existing data is present at the readout central coordinate and a clear-cut style of print is selected. If this is so, a step 171 is initiated Otherwise, a step 164 is initiated in which values of X+, X−, X, Y−, Y+ and Y are computed. Thereafter, in a step 165, it is determined if the absolute value X is 3 and the absolute value of Y is 1. If X=3 and Y=1, a process 1 is initiated in a step 166. Otherwise, in a step 167, it is determined if the absolute value of X is 1 and the absolute value of Y is 3. If $|X|=1$ and $|Y|=3$, a process 2 is initiated in a step 168. Otherwise, in a step 169, it is determined if the absolute value of X is 2 and the absolute value of Y is 2. If X=2 and Y=2, a step 170 initiates a process 3''.

If the conditions of steps 165, 167 and 169 are not met, in a step 171, the dot existence data of the central readout coordinate, multiplied by the enlargement factor, is output. Then, in a step 172, it is determined whether data to be processed is still present. If there are data locations remaining, the central readout coordinate is moved by one and the steps are repeated, beginning with step 163. Otherwise, the process ends.

In process 3'', in step 174, it is determined if $|X-|X+|=2$ and the central readout coordinate is the null data. If the conditions of step 174 are not met, in a step 175 it is determined whether $|X+|+|X-|=4$ and the readout central coordinate is dot data and Gothic style characters are selected. If the conditions of step 175 are not met, step 171 is initiated.

If the conditions of step 174 or step 175 are met, in a step 176, it is determined whether the value of X is greater than 0. If X>0, a step 177 is initiated. Otherwise, a step 178 is initiated in which it is determined whether Gothic characters are selected. If Gothic characters are to be printed, a step 179 is initiated, otherwise, a step 180 is initiated.

In step 180, it is determined whether Y is positive. If Y>0, a pattern shown in a step 182 is selected. Otherwise, a pattern shown in a step 181 is selected. In step 179, it is determined if Y is positive. It Y>0, a pattern shown in a step 184 is output. Otherwise, a pattern shown in a step 183 is output. In step 177, it is determined if Y>0. If Y is positive, a pattern shown in a step 186 is output, otherwise a pattern shown in a step 185 is output.

When a clear-cut style character is output to process buffer 10 in this state, and if the readout central coordinate is at (0, 0) it implies the null data. The values of X and Y are "0". Conversion pattern generating circuit 31 makes a judgment in view of the values of X and Y with respect to steps 165, 167 and 169. Since the requirements of these steps are not met, circuit 31 jumps over to step 171 and outputs the (2×2) - fold null data.

When the readout central coordinate moves to (3, 2), region [II], a pattern illustrated in FIG. 13(b) is obtained. The dot existence data "1" at the readout central coordinate is cut out by region readout circuit 11. The conditions of step 163 are met and conversion pattern generating circuit 31 enters step 171 and outputs a pattern obtained by simply quadrupling dot existence data "1".

In step 163, if a dot signal appears at the readout central coordinate, conversion pattern generating circuit 31 jumps to step 171 and outputs a (2×2) - fold dot existence signal, whereby an enlarged pattern having no thin part in the lines can be generated.

When the central coordinate shifts to (5, 2) (region [IV]), region readout circuit 11 cuts out a pattern depicted in FIG. 13(d). The absolute value of X of this pattern is "2" and the absolute value of Y is "2". Conversion pattern generating circuit 31 jumps to step 169 and comes into process 3.

In this pattern, $|X-|+|X+|=2$. Signal "0" is output from dot judging circuit 16 and no dot exists at the central coordinate. This initiates step 176. The value of X is not >0 so pattern generating circuit 31 enters a step 178.

Because the clear-cut style character, not the Gothic style character, is being read out in step 178, step 180 begins. The value of Y is greater than zero so conversion pattern generating circuit 31 selects the pattern of step 182. Consequently, (2×2) - fold enlargement of a null area is effected in accordance with the data in which a single dot is supplemented to the null area shaping the stepped portion to reduce the stepped shape of the portion being enlarged.

However, if a Gothic character were selected, the linear width of the enlarged character pattern should be as uniform as possible. The pattern illustrated in steps 183 or 184 would be selected. These patterns have as many dots as possible. The dots at three parts in this embodiment are in a content of collapse difference associated with the original pattern. With this arrangement, it is feasible to prevent the lines from being thickened or thinned to a significant degree to generate high quality enlarged Gothic characters.

It will thus be see that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A device for generating dot pattern data for forming a depiction of at least one of images and characters of a first size formed by the presence or absence of dots in a dot location matrix and of an enlarged second size that are formed of dots in an enlarged matrix having a multiple of the number of dot locations as the matrix of the first size, comprising:

character generator means for storing character code data for a first size character or image dot pattern represented by the existence or non-existence of dots in a first size dot location matrix, receiving depiction information from an external signal corresponding to a selected character or image and generating a first size dot location matrix signal corresponding to the depiction information;

region readout means for receiving the first size dot location matrix signal from the character generator means and reading a matrix region of the first size dot location matrix, said matrix region formed with one dot location from the first size dot pattern rad from said character generator means being essentially centered in the matrix region and other dot locations surrounding the centered dot location, said dot locations of the matrix region arranged in rows and columns;

X-value/Y-value arithmetic means for computing a horizontal value for each row of said matrix region and a vertical value for each column of said matrix region based on the existence of dots within dot locations of the columns and rows of the matrix region; and enlarged dot pattern generating means for selectively generating a multiple of dot locations and dots with respect to the dot locations and dots of the first size dot location matrix and selectively generating dots corresponding to null regions of the enlarged dot location matrix contiguous to stepped portions of the enlarged dot pattern of the dot location matrix on the basis of said horizontal and vertical values, for the second enlarged size depiction.

2. The device for generating dot pattern data of claim 1 and including addition/deletion determining means sending a signal to the pattern generating means for adding to or deleting from the dots for the enlarged size pattern, depending on said horizontal and vertical values.

3. The device for generating dot pattern data on claim 2 and including character type selecting means sending a signal to the pattern generating means for selecting whether an operation of said addition/deletion determining means is made effective or ineffective according to character pattern types.

4. The device for generating dot pattern data of claim 1, wherein said region of the first size character dot pattern is a 3×3 matrix of dot locations essentially centered around said one dot and the arithmetic means computes the horizontal and vertical values based on the presence of dots in the dot locations of the four outer sides of the 3×3 matrix.

5. A device for generating dot pattern data for forming a depiction of at least one of images and characters of a first size formed by the presence or absence of dots in a dot location matrix and of an enlarged second size formed by the presence or absence of dots in an enlarged dot location matrix having a multiple of said number of dot locations, comprising:

character generator means for storing character code data for a first size character or image dot pattern represented by the existence or non-existence of dots in dot locations of a first size dot location matrix, receiving depiction information from an external signal corresponding to a selected character or image and generating a first size dot location matrix signal corresponding to the depiction information;

region readout means for receiving the first size dot location matrix signal from the character generator means and reading a matrix portion of the first size dot location matrix read from said character generator means in which one dot location for the first size character or image dot pattern is essentially centered in the matrix portion and dot locations surrounding the centered dot location are arranged in columns and rows;

X-value/Y-value arithmetic means for computing a horizontal value for each row of the matrix portion and a vertical value for each column of the matrix portion based on the existence and non-existence of dots in the dot locations of the columns and rows of the matrix portion;

dot location multiplier means for generating a multiple of dot locations from each dot location of the first sized dot location matrix; and enlarged pattern generating means for selectively generating a multiple of dots corresponding to one dot of the original pattern for the multiple dot locations formed by the dot location multiplier means to form an enlarged character or image pattern and for selectively generating dots for additional dot locations formed by the dot location multiplier means contiguous to stepped portions of the enlarged pattern on the basis of said horizontal and vertical values, to smooth stepped portions intended to represent smooth oblique lines.

6. The device for generating dot pattern data of claim 5 and including addition/deletion determining means sending a signal to the pattern generating means for adding to or deleting dots at the periphery of the pattern depending on said horizontal and vertical values.

7. The device for generating dot pattern data of claim 6 and including character type selecting means responsive to a signal from the addition/deletion determining means and sending a signal to the pattern generating means for selecting whether an operation of said addition/deletion determining means is made effective or ineffective depending on a selected character type.

8. The device for generating dot pattern data of claim 5, wherein the portion of the matrix is a 3×3 matrix portion centered around a dot location.

9. The device for generating dot pattern data of claim 8, wherein the arithmetic means computes horizontal and vertical values based on the existence of dots in the dot locations of the four outer sides of the 3×3 matrix.

10. The device for generating dot pattern data of claim 5, wherein the dot location multiplier means generates four dot locations for each original dot location.

11. The device for generating dot pattern data of claim 10, wherein the pattern generating means can selectively generate one, two or three dots to be selectively positioned in the four dot locations corresponding to a dot location of the first size pattern having no dot and bordering a dot location of the first size pattern having a dot and forming a portion of an oblique line.

12. A method of operating a device for generating dot pattern data for forming at least one of images and characters of a first size formed of a dot pattern having a selected number of dots and of an enlarged second size having a multiple of the number of dots forming the first size images and characters, comprising the steps of:

storing data for at least one of an enlarged character pattern or an enlarged image pattern represented by the existence or non-existence of dots in a dot location matrix;

reading a matrix portion of the dot location matrix in which one dot location of the matrix is essentially centered in the matrix portion and the matrix portion is formed of columns and rows of dot locations;

calculating a horizontal arithmetic value for each row of the matrix portion and a vertical arithmetic value for each column of the matrix portion based on the existence or the non-existence of dots in the dot locations of the columns and rows of the matrix portion; and selectively generating dots for the dot locations to form an enlarged second size dot pattern and selectively generating or removing dots at dot locations of the dot pattern at stepped portions simulating smooth lines of the first size dot pattern based on the arithmetic values to smooth the appearance of said stepped portions in the enlarged size.

13. The method for generating dot pattern data of claim 12, wherein the matrix portion is a 3×3 matrix of dot locations.

14. The method for generating dot pattern data of claim 13, wherein the arithmetic values are based on the existence and non-existence of dots in dot locations forming the four sides of the 3×3 matrix.

15. The method for generating dot pattern data of claim 14, wherein the enlarged second size is four times as large as the first size and said multiple is four so that a 2×2 matrix of dot locations of the second size character pattern corresponds to each dot location of the first size character pattern.

16. The method for generating dot pattern data of claim 14, wherein if a dot does not exist at the dot location of the center of the matrix portion, the arithmetic values determine whether one of at least a first, second ad third dot supplementing processes are initiated, the at least first, second and third dot supplementing processed providing dot patterns for the multiple dot locations of the second size pattern corresponding to the dot location at the center of the matrix portion to smooth enlarged stepped portions of the first size character pattern.

17. The method for generating dot pattern data of claim 16, wherein if a dot exists at the dot location at the center of the matrix portion it is determined whether to generate said multiple number of dots or a lesser number of dots at the multiple dot locations corresponding to the dot location at the center of the matrix portion, based on the arithmetic values.

18. The method for generating dot pattern data of claim 17 and determining the type of character to be printed and smoothing the stepped portions by generating dots to form thick oblique lines or thinner oblique lines having fewer dots than the thick lines, based on the character type.

19. The method for generating dot pattern data of claim 12, wherein the enlarged second size is four times as large as the first size and said multiple is four so that a 2×2 matrix of dot locations of the second size character pattern corresponds to each dot location of the first size character pattern.

20. The method for generating dot pattern data of claim 19, wherein if a dot does not exist at the dot location at the center of the matrix portion, the arithmetic values determine whether one of at least a first, second or third dot supplementing processes are initiated, the at least first, second and third dot supplementing processes providing dot patterns for the multiple dot locations of the second size pattern corresponding to the dot location at the center of the matrix portion to smooth enlarged stepped portions of the first size character pattern.

21. The method for generating dot pattern data of claim 20, wherein the dot supplementing processes selectively add one, two or three dots to the dot locations of the 2×2 matrix.

22. The method for generating dot pattern data of claim 20, wherein if a dot exists at the dot location at the center of the matrix portion it is determined whether to generate said multiple number of dots or a lesser number of dots at the multiple dot locations corresponding to the dot location at the center of the matrix portion, based on the arithmetic values.

* * * * *

UNITED STATES PATENT AND TRADEMARK OFFICE
CERTIFICATE OF CORRECTION

PATENT NO.   : 5,222,208
DATED        : June 22, 1993
INVENTOR(S)  : Masatoshi Matsuhira It is certified that error appears in the above-identified patent and that said Letters Patent is hereby corrected as shown below:

On the cover page, after [22] Filed:, delete "Mar. 2, 1993" and insert --Mar. 2, 1990--.

Signed and Sealed this

Twenty-second Day of February, 1994

Attest:

BRUCE LEHMAN

Attesting Officer          Commissioner of Patents and Trademarks